Jan. 8, 1952 H. W. BESSELL 2,582,096

TOY TELEPHONE

Filed April 4, 1950

Howard W. Bessell
Inventor

By Seymour Earle Nichols
Attorneys

Patented Jan. 8, 1952

2,582,096

UNITED STATES PATENT OFFICE 2,582,096

TOY TELEPHONE

Howard W. Bessell, Manhasset, N. Y., assignor to The N. N. Hill Brass Company, East Hampton, Conn., a corporation of Connecticut Application April 4, 1950, Serial No. 153,898

2 Claims. (Cl. 46—33)

The present invention relates in general to toys and in particular to the class of toys which includes imitation telephones, the invention being concerned primarily with a toy telephone having improved means for simulating a voice emanating from the receiver thereof.

An object of the invention is to provide a superior toy telephone.

A further object of the invention is to provide a toy telephone with sound-producing means for simulating a voice emanating from the receiver of the telephone.

A still further object of the invention is to provide a toy telephone having a superior receiver and sounding-device.

Other objects and advantages will appear to those skilled in the art from the following, considered in conjunction with the accompanying drawings.

In the accompanying drawings, in which certain modes of carrying out the present invention are shown for illustrative purposes:

Figure 1:
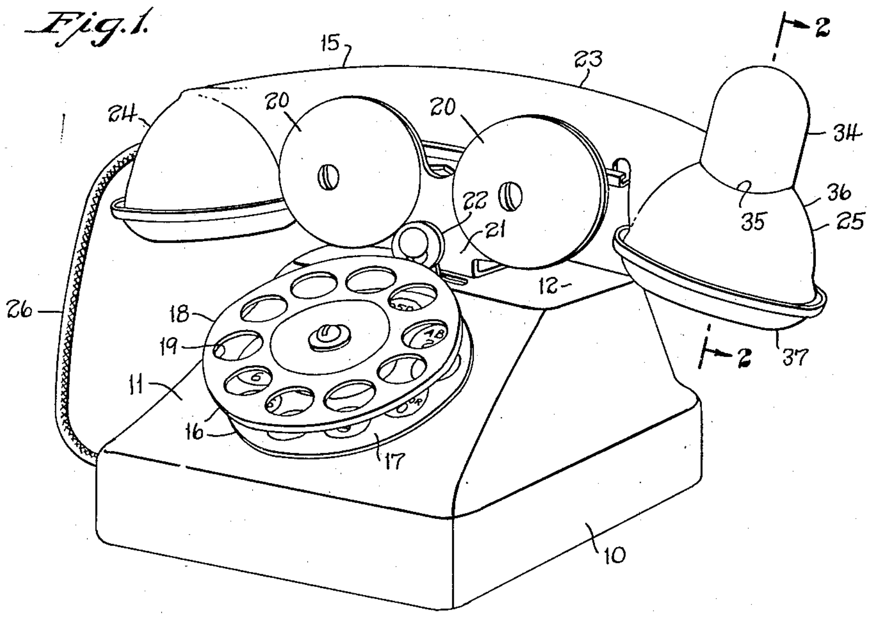
Fig. 1 is a perspective view of a toy telephone embodying the sound-producing means of this invention in the receiver thereof.

The toy telephone of this invention is made to simulate closely a regular telephone, but wherein the signaling is done by means of a dial having bells associated therewith, while the talking effects are produced by means of a manually-operated voice-simulating device mounted in the receiver of the handset of the telephone.

Referring to the drawings, the numeral 10 indicates the base of the telephone which is a substantially-rectangular shell-like member formed of sheet metal or equivalent material and simulating the base of a regular telephone set. To this end, the top of the base-member 10 embodies an upwardly-inclined dial-means supporting-surface 11, the upper rear edge of which blends into a substantially-horizontal surface 12 on which is mounted the usual yoke or rest for supporting the handset 15 of the telephone.

The signal-means of the telephone comprises dial-means 16 consisting of a disk 17 having characters thereon and fastened securely on the inclined surface 11 of the base; and a dialing-disk 18 supported above the disk 17 for rotation concentric thereto and having openings 19 therein arranged to overlie the characters of the disk 17, to permit dialing a telephone number as in a regular telephone set. Cooperatively associated with the dial-means 16 is an audible signal comprising a pair of bells 20—20 supported in a substantially-vertical plane intermediate the dial-means 16 and the handset-supporting rest by means of an upstanding-bracket 21 fastened to the horizontal surface 12 of the base. Suitable operating-means (not shown) is provided within the base to cause a striker 22 located between the bells 20—20 to engage and sound the bells whenever the dialing-disk 18 is rotated to dial a number.

The handset 15 of the telephone comprises a handhold-bar 23 formed preferably as a hollow sheet-metal member and provided at its opposite ends with cup-shaped enlargements constituting an imitation transmitter 24 and an imitation receiver 25 respectively, the transmitter being provided with a cord 26, the opposite end of which is secured in the base of the telephone.

Figures 2, 3:
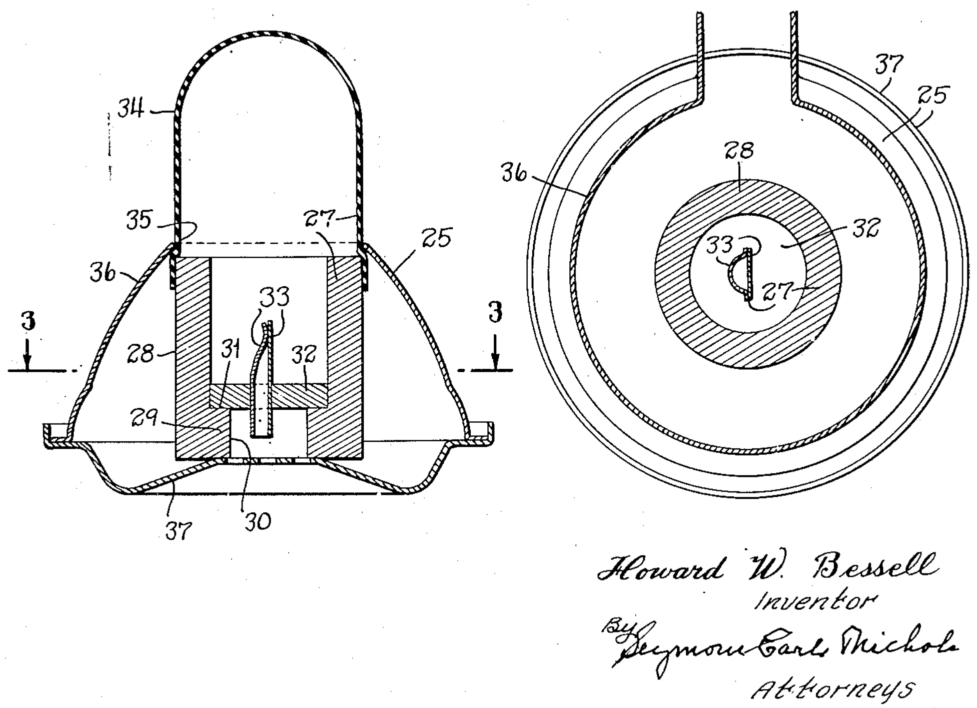
Fig. 2 is an enlarged broken sectional view of the handset of the telephone on line 2—2 of Fig. 1 and showing details of the receiver, including the sound-producing means therein.
Fig. 3 is a transverse sectional view taken on line 3—3 of Fig. 2.

The invention relates more especially to the receiver 25 of the handset and, in particular, to sounding-means mounted therein for simulating a voice. Referring especially to Fig. 2, the sounding-means of the receiver is indicated generally at 27 and comprises a substantially-cylindrical mounting-sleeve 28 formed preferably of a relatively-thick inexpensive composition material such as, for example, pulpboard or an equivalent material, the upper end of the mounting-sleeve 28 being open and the lower or inner end of the sleeve being provided with an end-closure 29 having a central aperture 30. Supported within the sleeve 28 on the inner annular shoulder 31 of the end-closure 29, is a substantially-solid disk-shaped plug 32 formed of an inexpensive composition material such as pulpboard or the like, and provided with a central aperture in which is secured a brass reed 33. The over-all length of the reed 33 exceeds the thickness of the plug 32 and is arranged such that opposite ends of the reed extend beyond the opposite faces respectively of the plug 32. Although a reed is used in the embodiment of the invention shown and described herein, it will be understood that it is within the purview of the invention to utilize other wind-actuated sound-producing means. Associated with the sleeve 28 is pneumatic-means for actuating the reed. In the preferred form, the pneumatic-means comprises a thimble-shaped rubber bulb 34, the lower or inner open end of which is stretched over the upper open end of the sleeve 28 to make a substantially-airtight seal therewith. Thus, by squeezing or pressing on the rubber bulb 34, air is forced through the reed 33 to produce a sound. The sounding-means 27 is supported in the receiver 25 by engagement in an aperture 35 formed in the rear wall or base 36 of the receiver substantially centrally thereof, such that the sounding-means 27 is supported with its longitudinal axis substantially at right angles to the front perforated face-plate 37 of the receiver, with the bulb 34 projecting outwardly through the aperture 35 into position for manual manipulation by the user of the telephone.

In using the toy telephone, a child will dial a number by rotating the apertured dialing-disk in the manner simulating a regular dial telephone, whereupon the striker will engage and ring the bells. The handset will then be lifted from its rest and the receiver 25 of the handset placed opposite the child's ear, whereupon by manually squeezing or pressing the rubber bulb 34 by the thumb of the hand holding the handset, the child may produce sounds in the receiver simulating a voice.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a toy telephone having an imitation base with a rest, and an imitation handset placeable on and removable from said rest and having a handle-hold bar and a transmitter and receiver at the opposite ends, respectively, of said bar of which the ear side of said receiver is apertured, the combination of a sounding reed in said receiver; and a manually depressible rubber bulb for sounding said reed, said rubber bulb being carried by, and in communication with the interior of, said receiver and projecting outwardly from said receiver opposite said ear side thereof so as to be accessible for depression by the thumb of a child's hand while the other fingers of the same hand grasp said handlehold bar and hold the handset with its receiver against an ear of the child.

2. In a toy telephone having an imitation base with a rest, and an imitation handset placeable on and removable from said rest and having a handlehold bar and a transmitter and receiver at the opposite ends, respectively, of said bar of which the ear side of said receiver is apertured, the combination of a mounting sleeve disposed in said receiver with its axis intersecting the ear side thereof; a reed mounted in said sleeve; and a resilient rubber bulb stretched over the sleeve end most remote from said ear side of the receiver and projecting to the outside of said receiver opposite said ear side thereof so as to be accessible for depression by the thumb of a child's hand to sound said reed while the other fingers of the same hand grasp said handlehold bar and hold the handset with its receiver against an ear of the child.

HOWARD W. BESSELL.

REFERENCES CITED

The following references are of record in the file of this patent:

UNITED STATES PATENTS

| Number | Name | Date |
|---|---|---|
| 1,782,786 | Marx | Nov. 25, 1930 |
| 1,877,160 | Conklin | Sept. 13, 1932 |
| 2,066,064 | Bregman | Dec. 29, 1936 |